UNITED STATES PATENT OFFICE.

HENRY HIRSCH, OF NEW YORK, N. Y.

IMPROVEMENT IN COMPOUNDS FOR MAKING CASTS FOR FANCY ARTICLES.

Specification forming part of Letters Patent No. 124,355, dated March 5, 1872.

*To all whom it may concern:*

Be it known that I, HENRY HIRSCH, of the city, county, and State of New York, have invented a new and Improved Compound for Making Casts; and I do hereby declare the following to be a full, clear, and exact description thereof, which will enable those skilled in the art to make and use the same.

This invention consists in a compound of paraffine, bleached bees-wax, and gypsum, ($SO_3$, $CaO+2aq$,) which ingredients, when mixed together in the proper proportion, form a semi-transparent compound of a white color, which can be readily cast in molds of any description, and which, when placed in hot water, becomes plastic, so that it can be easily pressed in any desired shape.

In preparing my compound, I take paraffine, one part; bleached bees-wax, one part; gypsum, two parts. The gypsum which I use is different from the material generally known as plaster Paris, inasmuch as the latter is sulphate of lime free of water, while the gypsum which I use contains two equivalents of water to each equivalent of sulphate of lime. The paraffine, the bees-wax, and the gypsum are taken of the purest white color; and, when the ingredients are thoroughly mixed, a compound is obtained which can be easily melted and cast into molds of any desired form or shape.

My compound has also the great advantage that the same, when placed in hot water, or heated to a temperature of about 110° to 120°, becomes plastic, so that it can be pressed into forms of various description. This last-named property is due to the bees-wax mixed with my compound. The casts produced from my compound are semi-transparent, and of a pure white color; and, owing to the bees-wax mixed with the paraffine and gypsum, said casts retain a certain degree of toughness, so that they can be handled without danger of being broken.

If desired, suitable pigments may be mixed with my compound to impart to the same any desired color.

Stearine and terra alba have been reduced to a plastic state, by being heated over a fire, for the purpose of forming a compound from which to cast fancy articles. Such I do not claim; but

What I claim as new, and desire to secure by Letters Patent, is—

The within-described compound, made substantially in the manner set forth.

HENRY HIRSCH.

Witnesses:
W. HAUFF,
E. F. KASTENHUBER.